April 18, 1967
N. A. WELCH
3,314,708
LEVER HANDLE CLUTCH
Filed Sept. 18, 1964
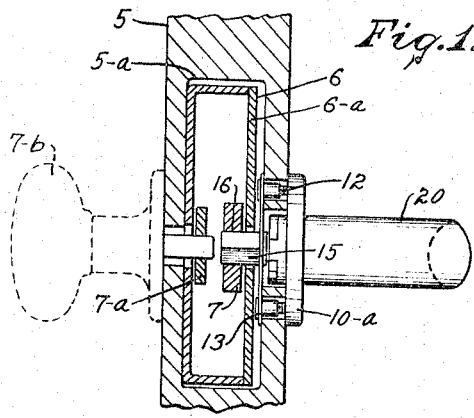
*Fig.1.*
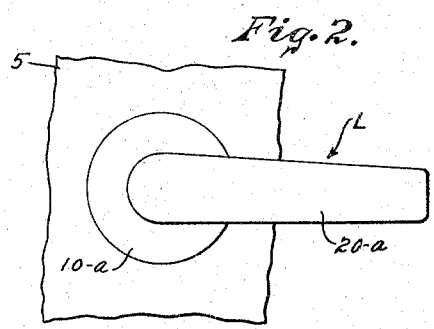
*Fig.2.*
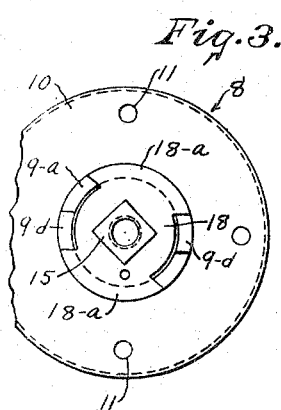
*Fig.3.*
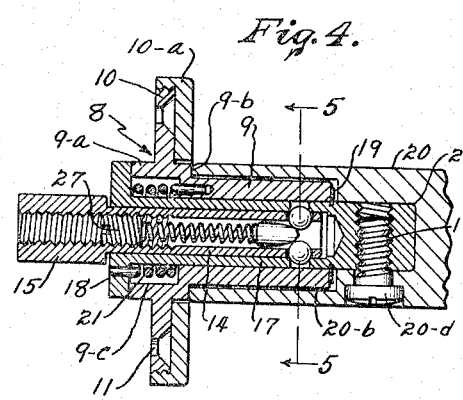
*Fig.4.*
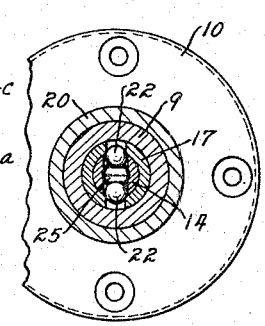
*Fig.5.*
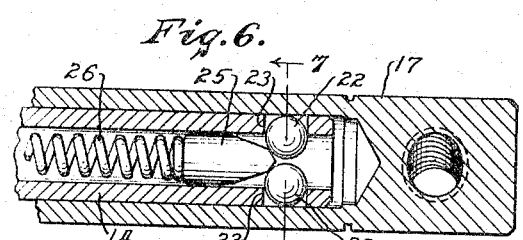
*Fig.6.*
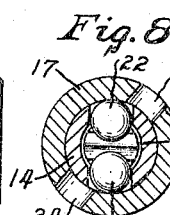
*Fig.8.*
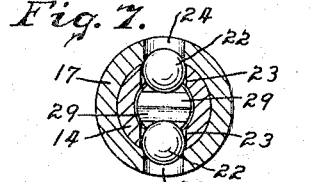
*Fig.7.* *Fig.9.* *Fig.10.*
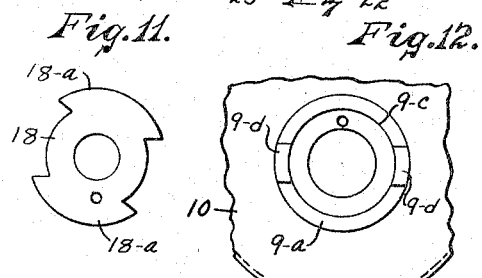
*Fig.11.* *Fig.12.* *Fig.13.*
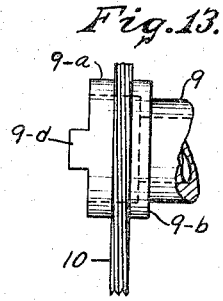
INVENTOR.
NICHOLAS A. WELCH

United States Patent Office 3,314,708
Patented Apr. 18, 1967

3,314,708
LEVER HANDLE CLUTCH
Nicholas A. Welch, West Hartford, Conn., assignor to Emhart Corporation, Bloomfield, Conn., a corporation of Connecticut
Filed Sept. 18, 1964, Ser. No. 397,394
8 Claims. (Cl. 292—336.5)

This invention relates to a clutch and more particularly to a clutch for coupling a lever handle to the rollback mechanism of a door lock.

Because of their aesthetically pleasing characteristics and adaptability to a wide variety of different designs, lever handles are currently being extensively used in place of door knobs for operating door locks, particularly door locks of the well-known mortise type. While the clutch of the present invention has a wide variety of practical applications, it is particularly useful with mortise locks since most such locks were originally designed to be operated by a pair of door knobs and the mechanisms thereof are generally not capable of withstanding the high torque loads that can be applied thereto with a lever handle. Consequently, serious breakage problems have resulted from the use of lever handles with mortise locks and these problems cannot be conveniently or economically resolved by redesigning the lock mechanism.

With the foregoing in mind, it is the principal object of the present invention to provide a clutch for coupling a lever handle to the rollback mechanism of a mortise lock, said clutch incorporating novel and highly efficient torque limiting means which are arranged so that the clutch acts as a rigid driving member between the lever handle and the rollback mechanism until some predetermined value of torque is exceeded, whereupon the clutch elements "break away" allowing free rotation of the lever handle relatively to the rollback mechanism.

Another object of the invention is to provide a lever handle clutch which can be adjusted to vary the "break away" torque so that the rollback mechanism can always be operated when the door lock is unlocked, but the strength of the rollback and the other elements of the lock mechanism cannot be exceeded when the door lock is locked.

A further object of the invention is to provide a clutch mechanism which can be accommodated in the slender shank of a lever handle and yet is simple in construction, economical in cost, durable and efficient in operation.

Another object of the invention is to provide a lever handle clutch mechanism which will automatically reengage after "breaking away" when the lever handle is returned to its normal position. Still another and very important object of this invention is to provide a lever handle clutch with which relatively high "break away" torques can be achieved, but wherein the force acting on the clutching elements is reduced to a negligible amount immediately upon "break away" so that very little torque is required to return the lever handle to its normal position.

The foregoing and other objects and advantages of the present invention will be more clearly understood from the following description and the accompanying drawing in which;

FIG. 1 is a side elevational view, partly in vertical section, illustrating a lever handle clutch embodying the present invention as used with a lock of the conventional mortise type.

FIG. 2 is an elevational front view of the lever handle clutch illustrated in FIG. 1.

FIG. 3 is an enlarged elevational view of the inner end of the clutch.

FIG. 4 is a sectional side view of said clutch illustrating the clutch mechanism in its normal engaged condition.

FIG. 5 is a sectional front view taken on line 5—5 of FIG. 4.

FIG. 6 is an enlarged fragmentary sectional view illustrating the clutch mechanism of the present invention in disengaged condition.

FIG. 7 is a sectional end view taken on line 7—7 of FIG. 6, but showing the clutch in engaged condition.

FIG. 8 is a view similar to FIG. 7, but illustrating the clutch in disengaged condition.

FIGS. 9 and 10 are simple diagrammatic views illustrating the forces applied to the clutching elements in the engaged and disengaged conditions of the clutch, respectively.

FIG. 11 is an elevational view illustrating the stop means employed in the clutch.

FIG. 12 is a similar view illustrating the inner end of the supporting member of the clutch.

FIG. 13 is a fragmentary elevational side view further illustrating said supporting member.

Referring now to FIG. 1 of the drawing wherein I have illustrated my novel clutch as used to couple a lever handle to a mortise lock of the conventional type, the numeral 5 denotes a portion of a door having a mortise 5-a formed in the free edge thereof in which a conventional mortise lock 6 is mounted. Said mortise lock includes a casing 6-a which houses a conventional lock mechanism (not shown) that is operated from the outer side of the door by an outer rollback 7. The lock mechanism also includes an inner rollback 7-a which is adapted to be operated by a conventional door knob 7-b mounted on the inner side of the door. Suitable means are also provided in the casing 6-a for dogging the rollback 7 against operation to prevent opening of the door from the outer side thereof.

The clutch of the present invention includes a supporting member 8 comprising an elongated, tubular, bearing tube 9 having a radial flange 10 adjacent its inner end. The inner end portion 9-a of said bearing tube is enlarged in diameter and defines an annular shoulder 9-b thereon spaced outwardly of said flange. Said inner end portion is also provided with a counterbore 9-c for a purpose to be hereinafter described.

Said flange 10 contains a plurality of circumaxially spaced, countersunk holes 11 therethrough for the reception of screws 12 that are employed to fasten the supporting member to the outer side of the door 5. Said screws are adapted to be threaded into internally threaded studs extending from a conventional anchor plate 13 located within the mortise and serve to clamp the flange tightly against the outer face of the door to prevent rotation of the supporting member, all as shown in FIGS. 1 and 4 of the drawing. The flange 10 is externally threaded and is adapted to receive an internally threaded, cup-shaped rose 10-a which conceals the flange and the screws 12, the outer face of said rose being disposed substantially flush with the shoulder 9-b on the bearing tube.

The clutch also includes a tubular spindle 14 having an inner end portion 15 of polygonal cross-sectional configuration adapted to fit into a complementary shaped opening 16 commonly provided in the outer rollback 7 of the door lock. The spindle 14 is rotatably mounted in a sleeve 17 that is, in turn, journalled in the bearing tube 9 of the supporting member 8. The sleeve 17 has a radial flange 18 at its inner end which abuts the inner end of the bearing tube 9 and prevents outward axial movement of the sleeve relatively to said bearing tube. The sleeve 17 is retained against inward axial movement in the bearing tube 9 by a retaining ring 19 which is disposed in an external annular groove in said sleeve and abuts the outer end of said bearing tube as best shown in FIG. 4. Rotation of the sleeve 17 relatively to said supporting member is limited through the coaction of radial lugs 18–a—18–a on the flange 18 with diametrically opposed stop fingers 9–d—9–d extending axially from the inner end of the bearing tube 9.

The outer end portion of the sleeve 17 extends beyond the outer end of the bearing tube 9 and is adapted to support a lever handle designated generally by the letter L. Said lever handle includes a cylindrical hub 20 and a grip portion 20–a which extends radially from the outer end of said hub. Said hub, as shown in FIG. 4, has an axial bore 20–b opening to its inner end adapted to receive the bearing tube 9 and a coaxial bore 20–c of reduced diameter adapted to snugly receive the outer end portion of the sleeve 17. The hub is affixed to said sleeve by means of a screw 20–d which extends through a radial hole in said hub and is threaded into a threaded hole 17–a in the outer end portion of the sleeve. Thus, the lever handle is supported for rotation relatively to the supporting member 8 by the sleeve 17, but the distance through which the lever handle may be turned is limited by the lugs 18–a—18–a and the stop fingers 9–d—9–d as will be evident from FIGS. 3 and 11 to 13. When the lever handle is assembled to the sleeve 17, the inner end of the hub 20 thereof is disposed closely adjacent the shoulder 9–b thereby effectively concealing the bearing tube 9.

The counterbore 9–c in the inner end of the bearing tube 9 is provided for the reception of a torsion spring 21 which surrounds the sleeve 17 and is confined between the bottom of the counterbore and the flange 18. One end of said spring is affixed to the flange 18 and said spring biases the sleeve in a counterclockwise direction, as viewed in FIG. 2, to yieldingly retain the lugs 18–a—18–a in engagement with their respective stop fingers 9–d—9–d and the grip portion of the handle L in its normal horizontal position. The spring 21 also functions to return the handle to its normal position after it has been rotated in a clockwise direction to operate the door lock.

In accordance with the present invention, I provide means in the clutch for effecting a disengageable driving connection between the sleeve 17 and the spindle 14 which limits the torque that can be applied to the rollback 7 of the lock mechanism with the lever handle L. Said means includes a pair of balls 22—22 which are movably mounted in coaxial holes 23—23 extending radially through the wall of the spindle 14 and normally project therefrom into ball receiving recesses 24—24 formed in the sleeve 17 to normally lock said sleeve and spindle together. In the illustrated form of the invention, the ball receiving recesses 24—24 are formed by coaxial holes which extend radially through the wall of the sleeve 17 and are of a smaller diameter than the balls 22—22 so that each of the balls will engage the inner annular edge of its respective recess radially outwardly of its center.

The balls 22—22 are biased into clutching engagement with the edges of the ball receiving recesses 24—24 by means of a wedge shaped plunger 25 which is axially slidably mounted in the bore of the spindle 14 and is biased between and into engagement with said balls by a compression spring 26 that is disposed between the plunger 25 and an adjusting screw 27 that is threaded into an internally threaded portion at the inner end of the bore in said spindle 14. The plunger 25 is of generally cylindrical configuration and its outer end portion is formed to provide diametrically opposed pairs of divergent cam surfaces 28—28 and 29—29 thereon, respectively. The angle of inclination of the inner cam surfaces 28—28 is considerably less than that of the outer cam surfaces 29—29 and a sharp edge 30 is formed where the inner and outer cam surfaces on each side of the plunger intersect.

In the normal engaged condition of the clutch, as shown in FIGS. 4, 5, 7 and 9, the balls 22—22 are disposed in the recesses 24—24 in the sleeve 17 and are engaged by the cam surfaces 28—28 on the plunger 25, whereby the radial component of the force exerted on the balls by the spring 26 through the plunger 25 is considerably greater than the axial component of said force as diagrammatically shown by the arrows 31 and 32 in FIG. 9. The balls are therefore held tightly in the recesses 24—24 in the sleeve 17 and establish a rigid driving connection between the sleeve 17 and the spindle 14 so that when the door lock is unlocked and the lever handle L is rotated, the rollback 7 will also be rotated to effect retraction of the latchbolt of the door lock. Of course, the angle through which the lever handle and the rollback can be rotated is limited by the engagement of the lugs 18–a—18–a on the flange 18 of the sleeve 17 with the stop fingers 9–d—9–d. This arrangement effectively prevents the application of excessive forces to the rollback and the other parts of the lock mechanism when the latchbolt has been fully retracted.

The outwardly directed radial force exerted on the balls 22—22 in the normal engaged condition of the clutch can be varied by moving the screw 27 either toward or away from the plunger 25 to thereby increase or decrease the spring force acting on the plunger. Generally, the screw 27 should be adjusted so that the torque required to disengage the clutch is considerably greater than that which can normally be expected to be applied to the lever handle by persons attempting to open the door when the rollback is dogged against operation. This will minimize the frequency of operation of the clutch, thereby reducing the wear and tear on its parts, and will also prevent premature disengagement of the clutch should the latchbolt be binding on its strike.

It will be apparent from the foregoing description and the accompanying drawing that when sufficient torque is exerted on the lever handle to overcome the outwardly directed radial force on the balls 22—22, the sleeve 17 will rotate relatively to the spindle 14. The balls 22—22 will then be cammed radially inwardly by the edges of the recesses 24—24 and will force the plunger axially inwardly against the force of the spring 26. As soon as the points of contact between the balls and the plunger pass over the edges 30—30 and onto the cam surfaces 29—29, the radial force exerted on the balls is abruptly and greatly reduced, as indicated by the arrows 33—33 in FIG. 10, because of the relatively steep angle of inclination of said cam surfaces. This reduces the frictional drag between the balls and the inner wall of the sleeve 17 and allows comparatively free rotation of said sleeve and said lever handle relatively to the spindle 14 until the lugs 18–a—18–a on the sleeve engage the stop fingers 9–d—9–d on the bearing tube, at which point further rotation of the lever handle is prevented.

When the lever handle is released, the torsion spring 21 will return it and the sleeve to their normal positions. The balls 22—22 will then be forced back into their respective recesses by the spring loaded plunger 25 and the cycle is ready to repeat.

While I have herein shown and described my invention in what I have conceived to be the most practical and preferred embodiment, it is recognized that departures may be made therefrom within the scope of my invention which is not to be limited to the details disclosed herein, but is to be accorded the full scope of the claims appended hereto so as to embrace any and all equivalent structures.

I claim:

1. In combination with a door lock having a rotatable rollback and a manually operable handle, clutch means for coupling said handle to said rollback including a rotatable driving member to which said handle is affixed, a rotatable driven member non-rotatably connected to said rollback, opposing clutching elements movable into and out of clutching position interconnecting said driving and driven members whereby axial rotation of said handle is transmitted to said rollback, and generally wedge-shaped cam means biasing said clutching element toward clutching position and adapted to exert a force thereon sufficient to retain said clutching elements in clutching position until a predetermined amount of torque applied to said handle is exceeded whereupon said clutching elements move out of clutching position against the bias of said cam means to permit rotation of said handle and said driving member relatively to said driven member and said rollback, said cam means being shaped and arranged to exert less force on said clutching elements when said clutching elements are out of clutching position to correspondingly reduce the frictional drag on said driving member.

2. In combination with a door lock having a rotatable rollback and a manually operable handle, clutch means for coupling said handle to said rollback including a stationary bearing member, a sleeve rotatable in said bearing member and to which said handle is affixed, a spindle rotatable in said sleeve and non-rotatably connected to said rollback, opposing clutching elements carried by said spindle and engageable in corresponding recesses in said sleeve to interconnect said sleeve and spindle whereby axial rotation of said handle is transmitted to said rollback, a spring carried by said spindle, and a generally chisel-shaped cam movably mounted in said spindle and through which said spring acts to bias said clutching elements into said recesses with sufficient force to prevent rotation of said sleeve relatively to said spindle until a predetermined amount of torque applied to said handle is exceeded whereupon said clutching elements are forced out of said recesses to permit rotation of said sleeve and said handle relatively to said spindle and said rollback, said cam having a first cam surface through which said spring acts when said clutching elements are engaged in said recesses and a second cam surface through which said spring acts when said clutching elements are disengaged from said recesses, said second cam surface being arranged so that less force is exerted on said clutching elements whereby to reduce the frictional drag on said sleeve.

3. In combination with a door lock having a rotatable rollback and a manually operable handle, clutch means for coupling said handle to said rollback including a stationary bearing member, a tubular sleeve rotatable in said bearing member and to which said handle is affixed, a tubular spindle rotatable in said sleeve and non-rotatably connected to said rollback, said spindle having radial holes in the wall thereof, said sleeve having radial recesses in the wall thereof alignable one with each of said holes, a ball movable radially in each of said holes and adapted to project therefrom into clutching engagement with the edge of the respective recess for transmitting axial rotation of said handle to said rollback, a plunger slidable axially in the bore of said spindle and having a series of cam surfaces thereon engaged one with each of said balls and inclined at an acute angle with respect to the axis of said spindle, a spring disposed in the bore of said spindle and biasing said plunger toward said balls, said spring acting through said cam surfaces to exert an outwardly directed radial force on said balls sufficient to retain them in clutching engagement with the edges of their respective recesses until a predetermined amount of torque applied to said lever handle is exceeded whereupon said balls are urged radially inwardly in said holes to permit rotation of said sleeve relatively to said spindle and shift said plunger against the bias of said spring.

4. In combination with a door lock having a rotatable rollback operatively connected to a latch and a rotatable handle manually operable from a first starting position to a second latch actuating position, clutch means for coupling said handle to said rollback including at least one clutching element movable into and out of a clutching position and through which clutching means rotation of said handle about its axis is transmitted to said rollback, means for exerting a force on said clutching element sufficient to retain said clutching element in clutching position provided a predetermined amount of torque applied to said handle is not exceeded but releasing said clutching element when said torque is exceeded, permitting rotation of said handle from said first starting position, and means for thereafter reducing the force exerted on said clutching element whereby said handle may be easily returned to its first starting position for any normal actuation of said latch.

5. In combination with a door lock having a rotatable rollback operatively connected to a latch and a rotatable handle manually operable from a first starting position to a second latch actuating position, clutch means for coupling said handle to said rollback including a clutching means movable into and out of a clutching position and through which clutching means rotation of said handle about its axis is transmitted to said rollback, means for exerting a force on said clutching element sufficient to retain said clutching element in clutching position provided a predetermined amount of torque applied to said handle is not exceeded but releasing said clutching means when said torque is exceeded, permitting rotation of said handle from said first starting position, spring means connected to said handle for returning said handle to said first starting position when it has been released by excess torque, and means for reducing the force exerted on said clutching means after the application of said excess torque whereby said handle may easily be returned by the spring means to said first starting position.

6. In combination with a door lock having a rotatable rollback operatively connected to a latch and a rotatable handle manually operable from a first starting position to a second latch actuating position, clutch means for coupling said handle to said rollback including a clutch housing having means for securing said housing in fixed position, a driving element projecting from said clutch housing into non-rotative engagement with said rollback, at least one clutching element within said housing movable into and out of a clutching position and through which clutching element rotation of said handle about its axis is transmitted to said rollback, means for exerting a force on said clutching element sufficient to retain said clutching element in clutching position provided a predetermined amount of torque applied to said handle is not exceeded but releasing said clutching element when said torque is exceeded and permitting rotation of said handle from said first starting position, and means for thereafter reducing the force exerted on said clutching element whereby said handle may be easily returned to its first starting position for normal actuation of said latch.

7. In combination with a door lock having a rotatable rollback operatively connected to a latch and a rotatable handle manually operable from a first starting position to a second latch actuating position, a stationary bearing member, a sleeve rotatable in said bearing member and to which said handle is affixed, a spindle rotatable in said sleeve having its inner end non-rotatably connected to said rollback, at least one clutching element in said sleeve movable into and out of a clutching position to operatively connect and disconnect said spindle and said sleeve, means for exerting a force on said clutching element sufficient to retain said clutching element in clutching position provided a predetermined amount of torque applied to said handle is not exceeded but releasing said clutching element when said torque is exceeded, said force means having a spring acting thereon which extends axially within said spindle, and an adjusting screw for the tension of said spring movable axially within said spindle, access to said screw being through the inner end of said spindle.

8. In combination with a door lock having a rotatable rollback operatively connected to a latch and a rotatable handle manually operable from a first starting position to a second latch actuating position, a stationary bearing member, a sleeve rotatable in said bearing member and to which said handle is affixed, a spindle rotatable in said sleeve having its inner end non-rotatably connected to said rollback, at least one first clutching aperture in said sleeve, a corresponding clutching aperture in said spindle movable into axial alignment with said first clutching aperture, a clutch ball movable through said spindle aperture into clutching engagement with the edge of said first clutching aperture, a wedge-shaped force element in said spindle movable against said ball, a spring means in said spindle for biasing said force element, and an adjusting screw movable in said spindle against said spring for adjusting the compression of said spring.

References Cited by the Examiner

UNITED STATES PATENTS

| | | | |
|---|---|---|---|
| 866,583 | 9/1907 | Hope. | |
| 1,936,665 | 11/1933 | Gauthier | 192—56 X |
| 2,459,920 | 1/1949 | Clark | 70—223 |
| 2,655,398 | 10/1953 | Birbaum | 292—356 |
| 2,837,190 | 6/1958 | Blakeslee | 192—56 |
| 2,881,602 | 4/1959 | Baker et al. | 64—29 |
| 2,919,602 | 1/1960 | Spraragen | 74—553 |
| 2,920,472 | 1/1960 | Welch | 70—216 |
| 2,955,443 | 10/1960 | Fulop | 64—28 |
| 3,080,029 | 3/1963 | Stober | 192—56 |
| 3,082,643 | 3/1963 | Grassi et al. | 74—553 |

FOREIGN PATENTS 1,236,000   8/1960   France.

EDWARD C. ALLEN, *Primary Examiner.*

RICHARD E. MOORE, *Examiner.*